United States Patent
Vaananen et al.

(10) Patent No.: US 9,497,099 B2
(45) Date of Patent: Nov. 15, 2016

(54) VOTING ARCHITECTURE FOR SAFETY AND MISSION CRITICAL SYSTEMS

(71) Applicant: Artesyn Embedded Computing, Inc., Tempe, AZ (US)

(72) Inventors: Pasi Jukka Petteri Vaananen, Waltham, MA (US); Martin Peter John Cornes, Phoenix, AZ (US)

(73) Assignee: Artesyn Embedded Computing, Inc., Tempe, AZ (US)

( * ) Notice: Subject to any disclaimer, the term of this patent is extended or adjusted under 35 U.S.C. 154(b) by 149 days.

(21) Appl. No.: 14/219,057

(22) Filed: Mar. 19, 2014

(65) Prior Publication Data

US 2015/0172162 A1    Jun. 18, 2015

Related U.S. Application Data

(60) Provisional application No. 61/916,458, filed on Dec. 16, 2013.

(51) Int. Cl.
| | |
|---|---|
| *H04L 29/06* | (2006.01) |
| *H04L 12/26* | (2006.01) |
| *G06F 21/54* | (2013.01) |
| *G06F 11/277* | (2006.01) |
| *B61L 27/00* | (2006.01) |
| *B61L 15/00* | (2006.01) |

(52) U.S. Cl.
CPC ............ *H04L 43/50* (2013.01); *B61L 15/0063* (2013.01); *B61L 27/0061* (2013.01); *G06F 21/54* (2013.01); *H04L 69/22* (2013.01); *G06F 11/277* (2013.01); *G06F 2201/83* (2013.01); *H04L 63/123* (2013.01)

(58) Field of Classification Search
CPC ............. G06F 11/277; G06F 11/2236; G06F 2201/83; G06F 21/54; G01R 31/318566; G01R 31/318547; G01R 31/31703; H04L 43/50; H04L 69/22; H04L 63/123; B61L 15/0063; B61L 27/0061
USPC .................................................. 714/797, 732
See application file for complete search history.

(56) References Cited

U.S. PATENT DOCUMENTS

| | | | | |
|---|---|---|---|---|
| 6,819,327 | B2 * | 11/2004 | Wasserman | G06F 3/1431 345/581 |
| 6,883,127 | B2 * | 4/2005 | Slawecki | G01R 31/31856 714/726 |
| 6,968,478 | B1 * | 11/2005 | Edwards | G06F 11/10 714/32 |
| 7,325,181 | B2 * | 1/2008 | Teglia | G06K 19/07372 380/264 |
| 7,437,642 | B1 * | 10/2008 | Ricks | A63H 19/24 246/187 A |
| 7,475,311 | B2 * | 1/2009 | Kiryu | G01R 31/31853 714/25 |
| 7,584,386 | B2 * | 9/2009 | Bancel | G06F 21/71 714/21 |
| 7,653,853 | B1 * | 1/2010 | Jairam | G01R 31/31851 714/703 |
| 7,669,100 | B2 * | 2/2010 | Pelley | G01R 31/31851 714/715 |
| 7,681,097 | B2 * | 3/2010 | Park | G01R 31/31703 377/69 |
| 7,797,599 | B2 * | 9/2010 | Khoche | G01R 31/31853 714/726 |

(Continued)

*Primary Examiner* — James C Kerveros
(74) *Attorney, Agent, or Firm* — Harness, Dickey & Pierce, P.L.C.

(57) ABSTRACT

A fault-tolerant failsafe computer voting system includes a switch module that generates a first copy of a first data packet and a second copy of the first data packet and that communicates the first copy and the second copy. The system also includes a first voting module that generates a first packet signature based on the first copy and communicates the first packet signature. The system further includes a second voting module that generates a second packet signature based on the second copy and communicates the second packet signature.

23 Claims, 5 Drawing Sheets

(56) References Cited

U.S. PATENT DOCUMENTS

| | | | | |
|---|---|---|---|---|
| 8,074,278 B2* | 12/2011 | Law | ................... | G05B 19/0426 713/188 |
| 8,281,198 B2* | 10/2012 | Henry | ..................... | G06F 11/10 714/732 |
| 8,612,814 B1* | 12/2013 | Tan | ........................ | G11C 29/44 714/732 |
| 8,768,003 B2* | 7/2014 | McMillan | .............. | H04H 20/14 382/100 |
| 2005/0138501 A1* | 6/2005 | Motika | ............ | G01R 31/31703 714/724 |
| 2014/0157073 A1* | 6/2014 | Douskey | ............ | G01R 31/3177 714/732 |

* cited by examiner

VOTING ARCHITECTURE FOR SAFETY AND MISSION CRITICAL SYSTEMS

CROSS-REFERENCE TO RELATED APPLICATIONS

This application claims the benefit of U.S. Provisional Application No. 61/916,458, filed on Dec. 16, 2013.

FIELD

The present disclosure relates to fault-tolerant failsafe computer systems.

BACKGROUND

This section provides background information related to the present disclosure which is not necessarily prior art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An external safety system, such as a railway system, may include fault-tolerant failsafe computer systems configured to implement a safety application. The fault-tolerant failsafe computer systems may include a plurality of hardware components electrically and logically coupled in order to implement the safety application. The safety application selectively communicates with safety critical hardware and software. The safety critical hardware and software are configured to control safety relevant functions of the railway system.

For example, a train riding on the railway system includes a braking system. The braking system is configured to implement at least one safety relevant function, such as a braking function. The braking system includes a brake and software configured to actuate the brake. The software receives instructions to actuate the brake. For example, an operator of the train may operate a braking system user interface in order to instruct the software to actuate the brake. Periodically, an erroneous instruction to actuate the brake may be generated by a faulty component of the railway system. Accordingly, a fault-tolerant failsafe computer system configured to validate instructions received by external safety systems is desired.

SUMMARY

This section provides a general summary of the disclosure, and is not a comprehensive disclosure of its full scope or all of its features.

A fault-tolerant failsafe computer voting system includes a switch module that generates a first copy of a first data packet and a second copy of the first data packet and that communicates the first copy and the second copy. The system also includes a first voting module that generates a first packet signature based on the first copy and communicates the first packet signature.

The system further includes a second voting module that generates a second packet signature based on the second copy and communicates the second packet signature, where the first voting module generates a first voting signal based on a comparison between the first packet signature and the second packet signature and the second voting module generates a second voting signal based on a comparison between the first packet signature and the second packet signature and where the first voting module communicates the first copy based on the first voting signal and the second voting signal.

In other features, a method includes generating a first copy of a first data packet and a second copy of the first data packet, communicating the first copy and the second copy, generating a first packet signature based on the first copy, communicating the first packet signature, generating a second packet signature based on the second copy, communicating the second packet signature, generating a first voting signal based on a comparison between the first packet signature and the second packet signature, generating a second voting signal based on a comparison between the first packet signature and the second packet signature, and communicating the first copy based on the first voting signal and the second voting signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
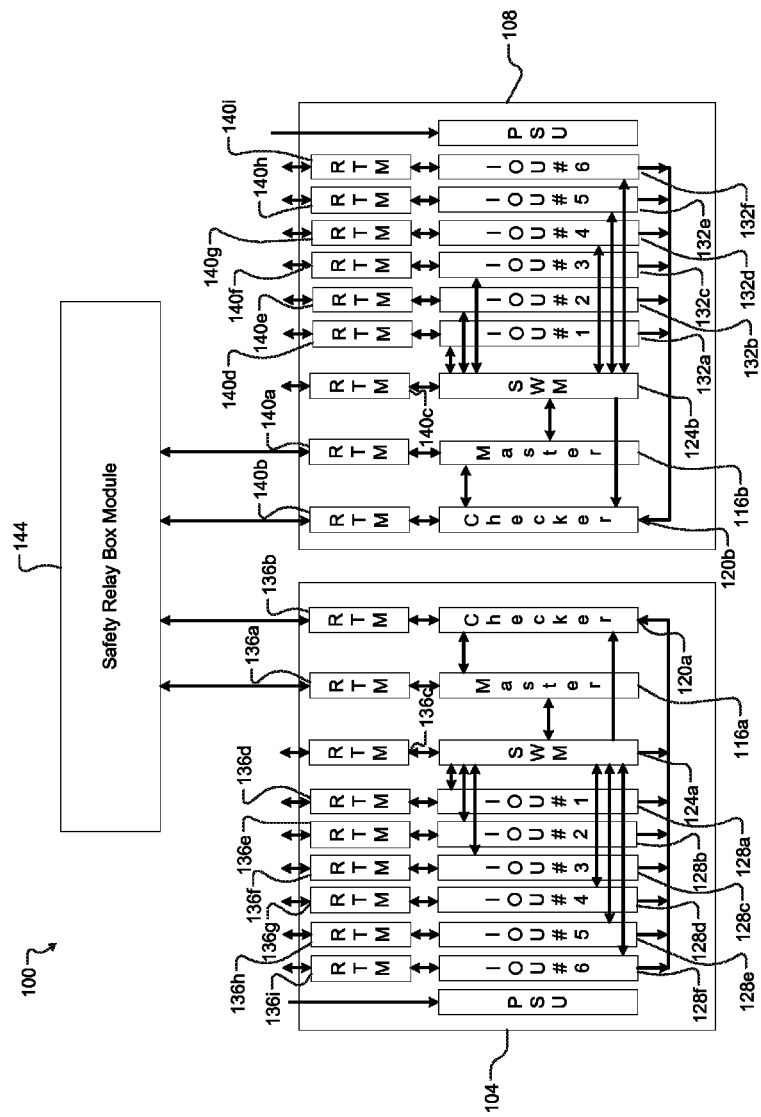
FIG. 1 is a functional block diagram of a fault-tolerant failsafe computer system according to the principles of the present disclosure.

Referring now to FIG. 1, a functional block diagram of an exemplary fault-tolerant failsafe computer system 100 is shown. The system 100 is arranged to interact with safety applications. For example, the system 100 is arranged to communicate with safety critical hardware and software associated, by way of non-limiting example, a railway system. The safety critical hardware and software control safety relevant components of the railway system. For example, the safety critical hardware may be coupled to a brake system of a train operating on the railway system. Further, the system 100 may be capable of being certified according to an industry recognized safety standard.

The safety critical hardware receives data elements from the safety critical software to actuate a brake of the brake system. The system 100 interfaces with the safety critical hardware and software to ensure the safety critical hardware and software are operating according to a predetermined operating standard. It is understood that while only a brake system of the train is described, the principles of the present disclosure apply to any safety critical hardware and software. Other possible applications for the embodiments described herein include, but are not limited to, components of an airline system, components of a medical treatment system, components of an oil and gas control system, components of a smart grid system, and components of various manufacturing systems.

In some implementations, the system 100 receives a plurality of incoming data packets from an external safety system, such as the railway system. The system 100 is configured to process the plurality of incoming data packets and communicate a plurality of outgoing data packets to safety relevant components of the external safety system. For example, the system 100 determines whether a first packet of the plurality of incoming data packets is a valid packet. When the system 100 determines the first packet is a valid packet, the system 100 communicates an outgoing packet to at least one safety relevant component of the railway system.

The first packet includes data elements to be acted on by the at least one safety relevant component of the railway system. The data elements may include sensor data and/or input/output (I/O) point states. The at least one safety relevant component may be a brake coupled to a train riding on the railway system. It is understood that while only safety relevant components of the external safety system are described, the first packet may include data elements to be acted on by non-safety relevant components of the external safety system. The data elements are formatted according to a transfer protocol. For example, the railway system is configured to package the data elements according to a predetermined packaging standard into transferable packets. The railway system then transfers the plurality of incoming data packets according to the transfer protocol.

The system 100 is arranged to receive packets transmitted according to the transfer protocol. Further, the system 100 is configured to interpret the predetermined packaging standard. The system 100 then extracts the data elements from the first packet and generates an outgoing data packet based on the data elements. The outgoing data packet includes a set of instructions based on the data elements. While only instructions are discussed, the outgoing data packet may also include operating instruction to control I/Os, a request to read an input in order to gather information, health message communications, a request for inter-process communication, or other suitable elements. The set of instructions includes at least one instruction that instructs at least one of the safety critical hardware and software to execute a procedure.

For example, the set of instructions may instruct the safety critical software to execute a braking procedure. The braking procedure includes hardware braking instructions. The hardware braking instructions are communicated to the safety critical hardware. The safety critical hardware executes the braking instructions. For example, the safety critical hardware applies a brake.

The system 100 determines whether to communicate the outgoing data packet and data elements to the safety critical hardware and software. For example, the system 100 ensures each of the plurality of incoming data packets meet a predetermined safety standard. The predetermined safety standard includes determining whether or not the railway system is operating according to a predefined set of operating standards. The system 100 verifies that each of the plurality of incoming data packets was intentionally transferred by the railway system 100. For example only, the railway system may transfer erroneous incoming data packets due to a hardware or software fault within the railway system.

The safety critical hardware and software receives the first packet of the plurality of incoming data packets in response to a command from an operator of the railway system. The safety critical hardware and software receives a second packet of the plurality of incoming data packets due to a fault in the railway system. The fault in the railway system may include, by way of non-limiting example only, a hardware failure such as a deteriorated electrical connection due to extended exposure to heat or moisture. The safety critical hardware and software communicate the plurality of incoming data packets, including the first and second packet, to the system 100. The system 100 is configured to determine whether each of the plurality of incoming data packets was received by the safety critical hardware and software as a result of a fault in the railway system.

When the system 100 determines one of the plurality of incoming data packets was received in response to a command from the operator, the system 100 generates an outgoing data packet corresponding to the received incoming data packet. For example, the system 100 generates a first outgoing data packet based on the first packet. The first outgoing data packet includes a set of instructions corresponding to the data elements within the first packet. When the system 100 determines the first packet is a valid packet, the system 100 communicates the first outgoing data packet to the safety critical hardware and software. For example, the system 100 determines the first packet was received in response to a command from the operator. The system 100 communicates the first outgoing data packet to the safety critical hardware and software. The safety critical hardware and software execute the set of instructions included in the first outgoing data packet.

Conversely, when the system 100 determines one of the plurality of incoming data packets was received in response to a fault within the railway system, the system 100 does not communicate an outgoing data packet to the safety critical hardware and software. For example, the system 100 determines the second packet was received due to a fault in the railway system. The system 100 does not communicate an outgoing data packet corresponding to the second packet to the safety critical hardware and software. Consequently, the safety critical hardware and software do not execute instructions corresponding to data elements included in the second packet.

Further, the system 100 generates a fault indication based on the determination that a fault occurred within the railway system. In this way, data elements executed by the safety critical hardware and software are first verified by the system 100. This verification ensures the railway system is operating according to the predetermined safety standard.

In some implementations, the system 100 receives a first packet of the plurality of incoming data packets. Simultaneously, the system 100 receives a second packet of the plurality of incoming data packets. The system 100 then executes voting logic on the first and second packet. The voting logic may be implemented as a dual two-of-two (2oo2) system. The 2oo2 voting logic is explained in greater detail below. The system 100 determines whether the first and second packets are identical. When the system 100 determines the first and second packets are identical, the system 100 generates a first outgoing data packet and communicates the first outgoing data packet to at least one component of the safety critical hardware and software.

The at least one component then executes operating data elements included within the first outgoing data packet. Conversely, when the first and second packets are not identical, the system 100 identifies at least one component of the system 100 or the railway system as faulty. It is understood that while a railway system is described, the principles of the present disclosure apply to any external safety systems.

The system 100 also generates a safety indication. The safety indication may be indicative of a failure within the system 100 or the safety critical hardware and software. Further, the system 100 instructs the at least one component to operate in a predetermined safe state. For example, the safe state may include a set of safe state data elements arranged to maintain a safe operating environment of the railway system.

The safe state data elements include instructing the railway system to operate in a predetermined operating mode that ensures the overall safety of the railway system. For example only, the predetermined operating mode includes bringing a train operating on the railway system to a stop. In some implementations, the safe state includes disabling all safety relevant communication interfaces. For example, a fail-safe computer operating in a safe state is incapable of communicating with the safety critical hardware and software. In this way, the fail-safe computer operating in the safe state is incapable of incorrectly instructing the safety critical hardware and software.

The system 100 includes an active fail-safe chassis (FSC) 104 and a standby FSC 108. In order to increase availability and reliability of the system 100, the active FSC 104 and the standby FSC 108 are redundant FSCs. For example, the active FSC 104 is configured to execute any and all operations of the standby FSC 108. In this way, when one of the active FSC 104 and the standby FSC 108 encounters a hardware or software failure, the other of the active FSC 104 and the standby FSC 108 is configured to operate in place of the failed FSC.

The active FSC 104 implements a two-out-of-two (2oo2) voting architecture that detects voting mismatches and performs a failsafe operation when a voting mismatch occurs. The 2oo2 voting architecture includes dual redundant processing and voting subsystems. The redundant processing and voting subsystems vote on packets entering or leaving the active FSC 104. For example, the active FSC 104 receives a plurality of incoming data packets. The active FSC 104 receives two copies of a first packet of the plurality of incoming data packets.

The active FSC 104 determines the validity of the first packet. The active FSC 104 continuously generates a first health status signal and a second health status signal based on the determination of whether the first packet is valid. In some implementations, continuously generating a signal may include setting the signal to a first predetermined value. The continuously generated signal is then maintained at the first predetermined value until the signal is de-asserted to a second predetermined value.

The active FSC 104 compares each of the two copies of the first packet. When the two copies are identical, the active FSC 104 determines the first packet is valid. The active FSC 104 continuously generates the first health status signal and the second health status signal when the active FSC 104 determines the first packet is valid. The first and second health status signals may be asserted to a first value. In some implementations, the first value is equal to 1. In another implementation, the first value may be a string of characters that indicate the FSC 104 is healthy.

Conversely, when the active FSC 104 determines the two copies of the first packet are not identical, the active FSC 104 de-asserts the first and second health status signals. It is understood that the first and second health status signals may be de-asserted to a second value. For example, the second value may be equal to 0. In another implementation, the second value may be a string of characters that indicate the FSC 104 is not healthy. As will be described in greater detail below, the active FSC 104 includes a first processor and a second processor. The first processor continuously generates the first health status signal when the first processor determines the copy of the first packet is valid. Similarly, the second processor continuously generates the second health status signal when the second processor determines the second copy of the first packet is valid.

The active FSC 104 communicates the first and second health status signals to the system 100. The system 100 monitors the first and second health status signal to determine whether the active FSC 104 is healthy. For example, when the system 100 receives the first and second health status signals, the system 100 determines the active FSC 104 is healthy. Conversely, when the system 100 does not receive one of the first health status signal and the second health status signal, the system 100 determines the active FSC 104 is not healthy.

As will be discussed in detail below, the system 100 instructs the active FSC 104 to operate in a safe state in order to maintain the safety of the system 100. It is understood that while only voting mismatches are discussed in relation to the first and second status signals being de-asserted, any hardware or software failure within the system 100 may cause one of the first and second status signals to be de-asserted. The health status signal may indicate the system 100 is operating according to a predetermined operating standard. In this way, the health status signal indicates the system 100 is healthy.

When the active FSC 104 determines that the two copies of the first packet are not identical, the active FSC 104 determines a voting fault has occurred. The active FSC 104 generates a fault signal based on the determination that a voting fault has occurred. The fault signal is indicative of a detected fault within the system 100. The fault may be due to hardware or software failure within the system 100 or the external safety system. For availability reasons, if the active FSC 104 encounters a hardware or software failure, the system 100 forces the active FSC 104 to a predetermined safe state. The standby FSC 108 then operates as the active FSC.

Each of the active FSC 104 and the standby FSC 108 may include a plurality of communication links. The communication links include, but are not limited to, uplinks, downlinks, and a user interface. An uplink is a bi-directional communication channel to higher-level equipment. The higher-level equipment may be system hardware included in an overall system architecture. For example, the higher-level equipment may be components of a railway braking system of the railway system.

A downlink is a bi-directional communication channel to lower-level hardware. For example, the lower-level hardware may include switches and relays that communicate with the higher-level equipment. The downlinks may be implemented following any suitable hardware standard. For example, the downlinks may be implemented as RS-232, RS-422, RS-485, CAN, MVB, Ethernet, Ethernet HSR Ring, or other suitable technology. A user interface is an interface designed to allow a user of the system 100 to access the components and subsystems of the system 100.

For example only, the user interface may implemented as a plurality of light emitting diodes (LEDs).

The communication links communicate with hardware components and software applications external to the system 100. Further, the system 100 is configured to receive input and communicate output to a field engineer. For example, the field engineer may selectively configure the system 100 by communicating with the a user interface of the system 100.

Each of the active FSC 104 and the standby FSC 108 are arranged to execute a health and safety application. For example, the active FSC 104 and the standby FSC 108 include a memory and a processor. The health and safety application may be software loaded into the memory of the active FSC 104 and the standby FSC 108. The health and safety application is then executed by the processor of the active FSC 104 and the standby FSC 108.

The health and safety application monitors and controls the active FSC 104 and the standby FSC 108. For example, the health and safety application generates a plurality of health signals. The plurality of health signals may include, but is not limited to, a module health signal and a mask signal. The health and safety application generates the plurality of signals based on a fault in active FSC 104, for example. The health and safety application is a functional safety subsystem designed to detect and respond to failures by forcing one of the active FSC 104 or the standby FSC 108 to the safe state.

It is understood that the health and safety application may include any safety applications executed on an external safety system. This may include ensuring the validity and safety of a set of data elements prior to the set of data elements being executed by the hardware and software of the railway system. The health and safety application is also configured to ensure the railway system operates in the predetermined safe state when the health and safety application detects a failure in the system 100.

Each of the active FSC 104 and the standby FSC 108 includes a processing subsystem. The active FSC 104 processing subsystem includes a master central processing unit (CPU) 116a and a checker CPU 120a. Similarly, the standby FSC 108 processing subsystem includes a master CPU 116b and a checker CPU 120b. Each of the master CPUs 116a and 116b are configured to be identical. Similarly, each of the checker CPUs 120a and 120b are configured to be identical. In this way, the master CPU 116a, the master CPU 116b, the checker CPU 120a, and the checker CPU 120b act to increase the availability and reliability of the system 100.

In order to monitor and control the overall health and safety of the system 100, the master CPU 116a and the checker CPU 120a are also configured to be identical. For example, the master CPUs 116a and the checker CPU 120a execute identical software and implement identical processing functions. The master CPU 116a and the checker CPU 120a are configured to perform identical functions in order to maintain full hardware fault and error detection coverage of the safety critical hardware and software and allow for voting on outgoing packets in the correct sequence.

In some implementations, the master CPU 116a receives a request to perform a task from at least one of the safety critical hardware or software of the railway system. The request to perform a task is based on a command received by the safety critical hardware and software from the operator of the external safety system. For example, the operator of the railway system may command a train riding on the railway system to increase speed. The operator may actuate a physical lever within the train. The physical lever is arranged to generate a signal indicative of the command to increase the speed of the train. The signal is communicated to the safety critical hardware and software.

Prior to executing the command, the safety critical hardware and software communicate the safety relevant task to the system 100. The system 100 is configured to interpret the signal and determine a requested task associated with the signal. The system 100 then determines whether the requested task is indicative of a safety relevant task. For example, the requested task may be a safety relevant task or a non-safety relevant task. In one example. a non-safety relevant task includes instructions that instruct the safety critical hardware and software to return a current status of the train operating within the railway system. In another example, a safety-relevant task includes instructions that instruct the safety critical hardware and software to increase the speed of the train.

The system 100 compares the requested task to a list of predefined tasks. The system 100 determines, based on the predefined tasks, whether the requested task is safety relevant. When system 100 determines the requested task is a safety relevant task, the system 100 generates a packet corresponding to the requested task. It is understood that while only a safety relevant task is described herein, the system 100 may generate a packet from any task. The system 100 communicates the packet to the master CPU 116a. Both the master CPU 116a and the checker CPU 120a are configured to verify the validity of the packet before the safety critical hardware and software execute the requested task. For example, the request to perform a task may be one of the plurality of incoming data packets.

Simultaneously, the checker CPU 120a receives a copy of the same packet corresponding to the requested task. Each of the master CPU 116a and the checker CPU 120a is configured to communicate a copy of the packet to the other of the master CPU 116a and the checker CPU 120a. Prior to the master CPU 116a instructing the safety critical hardware and software to perform the requested task, the master CPU 116a and the checker CPU 120a compare the packet received by each of the master CPU 116a and the checker CPU 120a. For example, the master CPU 116a and the checker CPU 120a perform 2oo2 voting on the packet.

When the packets are identical, the master CPU 116a instructs the safety critical hardware and software to perform the requested task. For example, the master CPU 116a and the checker CPU 120a generates an outgoing packet associated with the requested task. When voting is successful (i.e., the packets are identical) the master CPU 116a communicates the outgoing packet to the safety critical hardware and software to execute the requested task.

The outgoing packet may include operating data elements to control I/Os, a request to read an input in order to gather information, health messages, a request for inter-process communication, or other suitable requests associated with the safety critical hardware and software. The operating data elements may include a set of instructions that instruct one of the safety critical hardware and software to execute a predetermined procedure. For example, the operating data elements may instruct the safety critical software to execute an acceleration procedure. The acceleration procedure includes controlling at least one safety critical hardware component. The at least one hardware component includes a throttle mechanism of the train.

Conversely, when the packets are not identical, the master CPU 116a and the checker CPU 120a do not instruct the safety critical hardware and software to perform the requested task. The master CPU 116a generates a fault signal. The fault signal is indicative of a failure within the system 100, the safety critical hardware and software, or the external safety system. In this way, the master CPU 116a verifies that the requested task is a valid request from a valid source (i.e., an external hardware component or software application.)

For example only, the master CPU 116a receives erroneous requests to perform tasks due to external hardware failure, a software error, or an overall system malfunction. It is understood that while only the master CPU 116a and the checker CPU 120a are described, the principles described above also apply to the master CPU 116b and the checker CPU 120b.

Each of the active FSC 104 and the standby FSC 108 include a plurality of input/output unit (IOU) modules. The active FSC 104 includes IOU modules 128a-128f. The IOU modules 128a-128f will hereinafter be referred to as the IOU module 128. Similarly, the standby FSC 108 includes IOU modules 132a-132f, which are identical to the IOU modules 128a-128f. The IOU modules 132a-132f will hereinafter be referred to as the IOU module 132.

The active FSC 104 and the standby FSC 108 also each include a voting subsystem, an input/output (I/O) subsystem, and a switch module 124a and a switch module 124b respectively. The switch module 124a and the switch module 124b are configured to be identical. The switch module 124a and the switch module 124b route packets received from the I/O subsystem to the master CPUs 116a and 116b and the checker CPUs 120a and 120b.

For example, the switch module 124a may route a packet received from the master CPU 116a to an external network component. Further, the switch module 124a receives packets from an external component and routes the received packets to the master CPU 116a, the checker CPU 120b, and the I/O subsystem. Further, the switch module 124a communicates the received packets to the voting subsystem. It should be appreciated that while only the switch module 124a is described, the principles described above also apply to the switch module 124b.

The IOU module 128 implements the I/O subsystem within the active FSC 104. The I/O system is configured to provide a gateway between lower-level network equipment and the master CPU 116a and the checker CPU 120a. The IOU module 128 isolates the master CPU 116a and the checker CPU 120a from low level protocols required by external hardware and software. In this way, the IOU module 128 adds a safety layer on the internal Ethernet to support safe communication between the master CPU 116a, checker CPU 120a, and the external hardware and software. The IOU module 128 and the switch module 124a may be referred to collectively as the front blades 124a-128f. Similarly, the IOU module 132 and the switch module 124b may be referred to collectively as the front blades 124b-132f.

The active FSC 104 and the standby FSC 108 also include a plurality of rear transition modules (RTMs). The active FSC 104 includes RTMs 136a-136i. The standby FSC 108 includes RTMs 140a-140i. It should be appreciated that because the standby FSC 108 is a redundant configuration of the active FSC 104, the RTMs 136a-136i are identical to the RTMs 140a-140i. In some implementations, each of the RTMs 136a-136i may be hot swappable field replaceable units (FRUs).

For example, each of the RTMs 136a-136i may be removed and replaced by a field engineer without first having to power off the entire system 100. The RTMs 136a-136i allows the active FSC 104 to communicate with the external hardware and software components. For example, the RTM 136a electrically and logically couples the master CPU 116a to components external to the active FSC 104. Similarly, the RTM 136b electrically and logically couples the standby FSC 108 to external hardware and software components.

The front blades 124a-128f each includes a first memory location and a second memory location. The first and second memory locations store a value received from a corresponding hardware component of the active FSC 104. For example, the master CPU 116a continuously generates a module health signal (described above) indicative of the module health of the master CPU 116a. The master CPU 116a stores a 1 in the first memory location when the module health signal indicates the master CPU 116a is healthy.

Each of the front blades 124a-128f and the master CPU 116a generates a module health signal. Each of the front blades 124a-128f stores a value indicative of the module health signal in a first memory location. For example only, the switch module 124a stores a 1 in a first memory location associated with switch module 124a when the module health signal indicates the switch module 124a is healthy.

Conversely, the switch module 124a stores a 0 in the first memory location when the module health signal indicates the switch module 124a is not healthy. It is understood that while only the switch module 124a is described, the principles discussed herein apply to all modules within the system 100. It is further understood that while only storing a 1 and 0 based on the module health signal are described, any suitable indicator may be used to indicate the health of each of the modules within the system 100. Each of the modules within the system 100 then communicates the value stored in the associated first memory location to the master CPU 116a.

The master CPU 116a determines whether the active FSC 104 is healthy based on receipt of a plurality of values corresponding to the module health signals generated by each of the front blades 124a-128f and a module health signal generated by the master CPU 116a. For example only, the master CPU 116a determines that the active FSC 104 is healthy when each of the received values corresponding to the module health signals indicates that each of the modules within the system 100 is healthy. Conversely, the master CPU 116a determines that the active FSC 104 is not healthy when at least one of the received values corresponding to the module health signals indicates that at least one of the modules within the system 100 is not healthy.

In another implementation, a value indicative of the module health signal is stored in a module configured at the front of the system 100. For example, a module configured on the opposite side of the system 100 from the RTM 136s stores a 1 in the first memory location when the module health signal indications the master CPU 116a is healthy. It is understood that while only the master CPU 116a is described, the principles described herein apply to the checker CPU 120a.

The master CPU 116a receives a first packet of the plurality of incoming data packets. Simultaneously, the checker CPU 120a receives a copy of the first packet. The master CPU 116a and the checker CPU 120a determine whether the first packet and the copy of the first packet are identical. When the first packet and the copy of the first packet are identical, the master CPU 116a continuously generates a module health signal. The module health signal may be set to 1 or a high signal value. The value of the module health signal is indicative of the health of the active FSC 104. The master CPU 116a stores a 1 in the first memory location.

Conversely, when the first packet and the copy of the first packet are not identical, the master CPU 116a generates an invalid module health signal. For example, the master CPU 116a de-asserts the module health signal. The master CPU 116a stores a 0 in the first memory location. The master CPU 116a receives a mask signal indicative of the state of the mask register within the master CPU 116a. For example, the mask register is a programmable bit within each of the master CPU 116a and the checker CPU 120a.

The mask register is set when a requested task is a safety-relevant task. For example, the mask register is set to 1 when the system 100 determines the requested task is a safety-relevant task. The RTM 136a stores a 1 in the second memory location when the mask signal indicates the mask register within the master CPU 116a is set to a 1. Conversely, the RTM 136a stores a 0 in the second memory location when the mask signal indicates the mask register within the master CPU 116a is set to a 0.

The system 100 also includes a watchdog timer application. The watchdog timer application is a continuously running watchdog function that indicates whether the master CPU 116a is has stopped executing code. For example, the watch dog timer application monitors the master CPU 116a. The master CPU 116a generates a watchdog timer reset signal. The master CPU 116a communicates the watchdog timer reset signal to the watchdog timer application. The watchdog timer application determines whether the watchdog timer reset signal was received within a predefined period. For example, the predefined period may be 1 minute. The predefined period may be a configurable item.

The watchdog timer application generates a watchdog health signal based on the watchdog timer reset signal. For example, when the master CPU 116a communicates a watchdog timer reset signal after the predefined period, the watchdog timer application sets the watchdog health signal to 0. Conversely, when the master CPU 116a communicates the watchdog timer reset signal within the predefined period, the watchdog timer application sets the watchdog health signal to 1. In other words, the watchdog timer application determines a fault in the master CPU 116a when the master CPU 116a is incapable of communicating with the watchdog application within the predefined period. For example, the fault may be as a result of the master CPU 116a being stuck in a software loop. It is understood that while the only master CPU 116a is described above, the checker CPU 120a is configured to identical tasks as the master CPU 116a.

The RTM 136a communicates a module health value indicative of the overall health of the master CPU 116a. For example, the RTM 136a is configured to perform a logical OR on the value stored in the first memory location and the value stored in the second memory location. For example, when the value stored in the first memory location is 0 and when the value stored in the second memory location is 0 the RTM 136a will a communicate a module health value of 0.

When the value stored in the first memory location is 1 and the value stored in the second memory location is a 0, the RTM 136a communicates a module health value of 1. It is understood that each of the RTMs 136a-136i is configured to perform a logical OR on values stored within memory of associated with each of the front blades 124a-128f.

The RTMs 136a and 136b communicate a chassis health value to the safety relay box module 144. The safety relay box module 144 selectively determines which of FSCs within the system 100 will be the active FSC and which will be the standby FSC based on a plurality of chassis health values. For example, the safety relay box module 144 receives a plurality of chassis health values from the RTM 136a, RTM 136b, RTM 140a, and RTM 140b. The RTM 136a generates a first chassis health value based on the cumulative result of the module health signals generated by the master CPU 116a and the front blades 124a-128f and a value stored in the mask registers.

The RTM 136a communicates the chassis health value to the safety relay box module 144. Similarly, the RTM 136b generates a second chassis health value based the cumulative result of the module health signals generated by the checker CPU 120a and the front blades 124a-128f and a value stored in the mask registers. The RTM 140a generates a third chassis health value based on the cumulative result of the module health signals generated by the master CPU 116b and the front blades 124b-132f and a value stored in the mask registers. Similarly, the RTM 140b generates a fourth chassis health value based on the cumulative result of the module health signals generated by the checker CPU 120b and the front blades 124b-132f and a value stored in the mask registers.

The safety relay box module 144 determines which of the active FSC 104 and the standby FSC 108 will operate as an active FSC within the system 100. For example, the safety relay box module 144 determines the active FSC 104 will operate as the active FSC within the system 100 based the first-fourth chassis health values. The safety relay box module 144 determines the active FSC 104 will be the active FSC within the system 100 when the first and second chassis health signals indicate the active FSC 104 is healthy.

The safety relay box module 144 generates an active FSC signal and a standby FSC signal based on the active FSC determination. For example, the safety relay box module 144 generates a first active FSC signal and a second active FSC signal. The first and second active FSC signals are redundant signals that are both indicative of which FSC is elected to operate as the active FSC. The safety relay box module 144 also generates a first standby FSC signal and a second standby FSC signal.

The first and second standby FSC signals are redundant signals that are both indicative of which FSC was elected to operate as the standby FSC. The safety relay box module 144 communicates the first active FSC signal and the first standby FSC signal to the active FSC 104. Similarly, the safety relay box module communicates the second active FSC signal and the second standby FSC signal to the standby FSC 108.

The safety relay box module 144 also determines whether a fault has occurred in one of the active FSC 104 and the standby FSC 108 based on first-fourth chassis health signals. For example, the safety relay box module 144 determines a fault has occurred in the active FSC 104 when the safety relay box module 144 receives an invalid chassis health signal from one of the RTMs 136a and 136b. For example, an invalid chassis health signal may be a chassis health value of 0. The safety relay box module 144 generates a standby signal based on the invalid chassis health signal. The safety relay box module 144 communicates the standby signal to the active FSC 104. The active FSC 104 determines whether to enter the failsafe state based on the standby signal. For example, the active FSC 104 determines to enter the failsafe state when the active FSC 104 receives the standby signal.

The safety relay box module 144 generates an active signal based on the chassis health value. The safety relay box module 144 communicates the active signal to the standby FSC 108. The active signal indicates to the standby FSC 108 that the active FSC 104 is operating in the failsafe state or standby state. When the standby FSC 108 receives the active signal, the standby FSC 108 begins operating as the active FSC. In this way, the safety relay box module 144 forces a failed active FSC into a failsafe state, and alerts a standby FSC to assume the role of active FSC.

In some implementations, the safety relay box module 144 is configured to communicate with a plurality of commercial off the shelf (COTS) products. For example, the active FSC 104 and the standby FSC 108 may be COTS products implemented within the system 100. The active FSC 104 and the standby FSC 108 are configured according to a predetermined implementation standard. The implementation standard includes a predefined communication protocol.

The safety relay box module 144 is configured to receive and interpret signals and messages from the active FSC 104 and the standby FSC 108 according to the communication protocol. In this way, the safety relay box module 144 communicates with the active FSC 104 and the standby FSC 108 regardless of the physical characteristics of the active FSC 104 and the standby FSC 108 so long as the active FSC 104 and the standby FSC 108 follow the communication protocol. It is understood that the safety relay box module 144 communicates with any component within the system 100. Further, any component within the system 100 may be implemented utilizing COTS products so long as the any component follows the communication protocol.

In some implementations, the I/O subsystem also receives packets from external sources such as hardware and software components of the rail system. The received packets may include the plurality of incoming data packets as discussed above. The I/O subsystem then communicates the received packets to the voting subsystem.

The voting subsystem is a functional safety subsystem and is configured to detect and respond to failures. When the voting subsystem detects an error in one of the active FSC 104 and the standby FSC 108, the voting subsystem forces the one of the active FSC 104 and the standby FSC 108 to the failsafe state. The voting subsystem performs fault detection of the processing subsystem. For example, the master CPU 116*a* and the checker CPU 120*a* generate outgoing packets based on a requested task.

The voting subsystem compares the outgoing packets generated by the mater CPU 116*a* to the outgoing packets generated by the checker CPU 120*a*. When the outgoing packets are identical, the voting subsystem communicates a single copy of a packet to the switch module 124*a* and to the I/O subsystem. When the outgoing packets are not identical, the voting subsystem forces the active FSC 104 to the failsafe state. In this way, the voting subsystem detects faults in one of the active FSC 104 and the standby FSC 108. Upon detecting a fault in the one of the active FSC 104 and the standby FSC 108, the voting subsystem brings the system 100 to a safe state by forcing the faulty FSC to the failsafe state.

The voting subsystem also receives packets from the I/O subsystem. For example, the IOU modules 128 communicate with the voting subsystem via the switch modules 124*a*. The IOU modules 128 communicate a first packet to switch module 124*a*. The switch module 124*a* duplicates the first packet. For example, the switch module 124*a* generates a second packet. The second packet is a copy of the first packet. The switch module 124*a* communicates the first packet to the master CPU 116*a* and the checker CPU 120*a*. The master CPU 116*a* and the checker CPU 120*a* executing voting logic on the first and second packets as described above. In this way, the voting subsystem verifies the validity of the received packets.

In another example, the first packet may not be identical to the second packet due to a hardware malfunction in an external component, such as the safety critical hardware of the rail system. When the voting subsystem determines the first packet is not identical to the second packet, the safety application forces the active FSC 104 to the failsafe state. Additionally or alternatively, the mismatched packets may be silently discarded. For example, neither the master CPU 116*a* nor the checker 120*a* generates an outgoing packet based on the first and second packet. In this way, the system 100 may avoid excessive failover/failsafe transitions due to otherwise recoverable errors. In another implementation, input voting may be configured to result in failover/failsafe transition.

Figure 2:
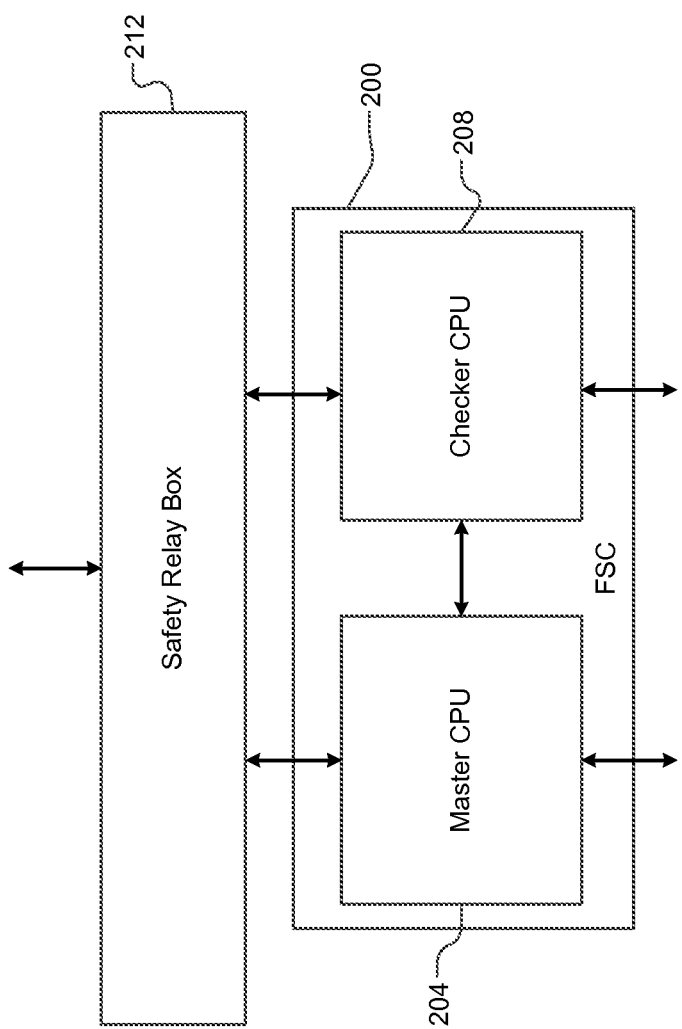
FIG. 2 is a functional block diagram of a fail-safe chassis according to the principles of the present disclosure.

Referring now to FIG. 2 a block diagram of an exemplary fail-safe chassis (FSC) according to the principles of the present disclosure is shown at 200. The FSC 200 includes a master CPU 204 and a checker CPU 208. The master CPU 204 and the checker CPU 208 execute identical software and implement identical processing functions. The master CPU 204 and the checker CPU 208 are configured to perform identical functions in order to maintain full hardware fault and error detection coverage of safety critical hardware and software.

For example, the master CPU 204 receives a request to perform a task from at least one of the safety critical hardware or software of an external safety system. The external safety system may be a system that is required to operate according to a predetermined safety standard, such as a railway system. The railway system includes safety critical hardware and software. The safety critical hardware and software interact with components of the railway system in order to control aspects of the railway system. For example, the safety critical hardware and software controls a train operating within the railway system.

The request to perform a task may include, but is not limited to, determining a status of a hardware component, engaging a brake of the railway system, or indicating to an operator of the railway system a location of a train operating within the railway system. The request to perform a task is received in the form of a packet. For example, the request to perform a task may be one of the plurality of incoming data packets.

Simultaneously, the checker CPU 208 receives a copy of the same request. Each of the master CPU 204 and the checker CPU 208 is configured to communicate a copy of the requested task to the other of the master CPU 204 and the checker 208. Prior to the master CPU 204 performing the requested task, the master CPU 204 and the checker CPU 208 compare the requested task received by each of the master CPU 204 and the checker CPU 208.

When the requested tasks are identical, the master CPU 204 and the checker CPU 208 communicate the requested task to the safety critical hardware and software. For example, the master CPU 204 and the checker CPU CPU 208 generates an outgoing packet associated with the requested task. The outgoing packet includes operating data elements. The operating data elements may include a set of instructions that instruct one of the safety critical hardware and software to execute a predetermined procedure. For example, the operating data elements may instruct the safety critical software to execute a brake engaging procedure. The brake engaging procedure includes controlling at least one safety critical hardware component. The at least one hardware component may include a brake mechanism of the railway system.

Conversely, when the requested tasks are not identical, the master CPU 204 and the checker CPU 208 do not communicate the requested task to the safety critical hardware and software. In this way, the master CPU 204 verifies that the requested task is a valid request from a valid source (i.e., an external hardware component or software application.) For example only, the master CPU 204 receives erroneous requests to perform tasks due to external hardware failure, a software error, or an overall system malfunction.

The master CPU 204 and the checker CPU 208 include a mask register. The mask register is a programmable bit within the master CPU 204 and the checker CPU 208. A value stored in the mask register is indicates whether a requested task is a safety-relevant task. For example, the mask register is set to 1 when the system 100 determines a requested task is a safety-relevant task. Further, the health and safety application sets the mask register when the system 100 is initially started.

The master CPU 204 and checker CPU 208 each continuously generate a module health signal based on a determination of whether the requests tasks are identical. When the master CPU 204 and the checker CPU 208 determine the requested tasks are identical, the master CPU 204 and the checker CPU 208 continuously generate the module health signal pulse. When the master CPU 204 and the checker CPU 208 determine the requested tasks are not identical, the master CPU 204 and the checker CPU 208 de-assert the module health signal pulse.

The master CPU 204 and the checker CPU 208 generate a chassis health signal pulse based on a plurality of module health signal pulse generated by each of a plurality of modules associated with the FSC 200. The FSC 200 includes similar features as those described with respect to the active FSC 104. For example, the FSC 200 includes the front blades 124a-128f as described above. Each of the modules within the FSC 200 continuously generates a module health signal (as described above). The master CPU 204 generates a first chassis health signal pulse when the plurality of module health signals indicates the FSC 200 is healthy. In other words, the first chassis health signal pulse is continuously asserted (i.e., set to 1) when the mask register indicates the requested task is safety relevant and the plurality of module health signals indicate the FSC 200 is healthy.

It is understood that when the mask register indicates the requested task is not safety relevant (i.e., the mask register is set to 0) the first module health signal pulse may be de-asserted. However, safety relevant procedures (i.e., forcing the active FSC 204 to a safe state) will not be executed. In this way, failover/failsafe procedures are only implemented when a fault occurs during a safety relevant task. The chassis health signal pulse is indicative of the overall health of the FSC 200.

It is understood that principles described with respect to the master CPU 204 apply to the checker CPU 208. The checker CPU 208 generates a second chassis health signal pulse based on a plurality of module health signal pulse generated by each of a plurality of modules associated with the FSC 200. The checker CPU 208 continuously generates the second chassis health signal pulse when the plurality of module health signals indicates the FSC 200 is healthy. The master CPU 204 communicates a first chassis health signal pulse to a safety relay box 212. Similarly, the checker CPU 208 communicates a second chassis health signal pulse to a safety relay box 212.

The safety relay box module 212 selectively determines whether the FSC 200 will operate as an active FSC based on a plurality of chassis health signals. For example, the safety relay box module 212 begins receiving a chassis health signal pulse from the master CPU 204 when the FSC 200 is initiated. The safety relay box 212 also begins receiving a chassis health signal pulse from the checker CPU 208. The safety relay box module 212 determines whether the FSC 200 will be elected as the active FSC based on the chassis health signals.

In some implementations, the safety relay box module 212 also receives a plurality of chassis health signal pulses from another FSC. The safety relay box module 212 determines whether the FSC 200 or the other FSC will be elected as the active FSC based on the plurality of chassis health signal pulses. For example, the safety relay box module 212 first determines whether one of the FSC 200 or the other FSC is healthy. The safety relay box module 212 determines the FSC 200 is healthy when the chassis health signal pulses received from the FSC 200 indicate the FSC 200 is healthy. For example, the safety relay box 212 determines the FSC 200 is healthy when the safety relay box 212 receives a chassis health signal from the FSC 200.

Similarly, the safety relay box module 212 determines the other FSC is healthy when the plurality of chassis health signal pulses received from the other FSC indicate the other FSC is healthy. When safety relay box module 212 determines that both of the FSC 200 and the other FSC are healthy, the safety relay box module 212 elects an active FSC based on which of the FSC 200 and the other FSC communicated one of the plurality of chassis health signal pulses first. For example, when the FSC 200 communicates a signal to the safety relay box module 212 before the other FSC communicates a signal to the safety relay box module 212, the safety relay box module 212 elects the FSC 200 as the active FSC.

The safety relay box module 212 monitors the health of the active FSC. For example, the safety relay box module 212 receives the first and second chassis health signal pulses from the FSC 200. The safety relay box module 212 determines whether a fault has occurred in the FSC 200 based on the first and second chassis health signal pulses. The safety relay box 212 determines a fault has occurred in the FSC 200 when at least one of the first and second chassis health signal pulses is indicative of a mismatch of the requested tasks. In other words, the safety relay box module 212 determines a fault has occurred when the safety relay box module 212 does not receive one of the first and second chassis health signal pulses.

The safety relay box module 212 generates a failsafe signal when the safety relay box module 212 determines a fault has occurred in the FSC 200. The safety relay box module 212 communicates the failsafe signal to the FSC 200. The FSC 200 determines whether to enter the safe state based on the failsafe signal. For example, the FSC 200 enters the safe state when the FSC 200 receives the failsafe signal. Conversely, the FSC 200 will continue to operate in the active FSC mode unless the FSC 200 receives a failsafe signal.

Alternatively, the FSC 200 may enter a standby state when the FSC 200 does not receive an active signal. The safety relay box module 212 communicates the active signal when the safety relay box module 212 determines the FSC 200 is to operate as the active FSC. The safety relay box module 212 continuously communicates the active signal to the FSC 200. When the safety relay box module 212 determines the FSC 200 is faulty, the safety relay box module 212 does not communicate an active signal to the FSC 200. The FSC 200 then operates in the standby state.

In some implementations, the plurality of chassis health signal pulses are implemented as dynamic pulse signals to eliminate undetected, latent failure modes. The safety relay box module 212 is configured to determine whether a pulse signal is stuck at 0 or stuck at 1. For example, the safety relay box 212 receives a first pulse signal from the master CPU 204. The safety relay box module 212 is configured to wait a predetermined period of time.

For example, the predetermined period of time may be a period corresponding to a time long enough for a dynamic pulse to reset. The safety relay box module 212 determines the first pulse signal is stuck when the first pulse signal has not been reset after the predetermined period. The safety relay box module 212 determines a fault in the master CPU 204 when then safety relay box module 212 determines the first pulse signal is stuck. The safety relay box module 212 generates a failsafe signal based on determining a fault in the master CPU 204.

Figure 3:
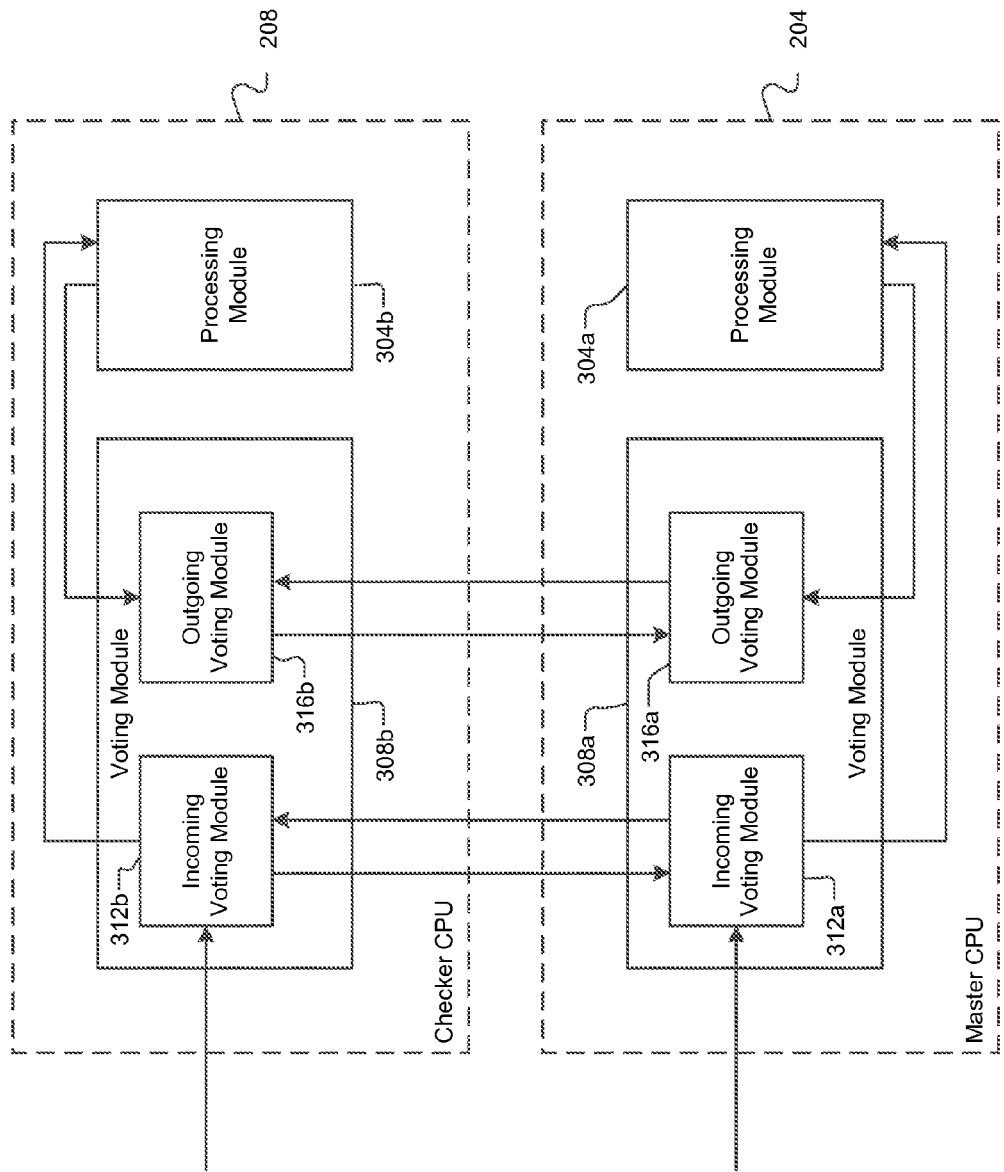
FIG. 3 is a functional block diagram of an alternative example of the voting subsystem according to the principles of the present disclosure.

With reference to FIG. 3, a functional block diagram of an alternative implementation of the voting subsystem including the master CPU 204 and the checker CPU 208 is shown. As described with reference to FIG. 1, each of the master CPU 204 and the checker CPU 208 include processing and voting subsystems. For example, each of the master CPU 204 and the checker CPU 208 includes a processing module and a voting module. In the example implementation, the master CPU 204 includes a processing module 304a and a voting module 308a. Similarly, the checker CPU 208 includes a processing module 304b and a voting module 308b.

As described with reference to FIG. 2, each of the master CPU 204 and the checker CPU 208 are configured to be identical. The master CPU 204 and the checker CPU 208 execute identical software and implement identical processing functions. The master CPU 204 and the checker CPU 208 are configured to perform identical functions in order to maintain full hardware fault and error detection coverage of safety critical hardware and software. It is therefore understood that the processing modules 304a and 304b are identical. Similarly, the voting modules 308a and 308b are identical.

As described with reference to FIGS. 1 and 2, each of the master CPU 204 and the checker CPU 208 receives a plurality of incoming data packets from an external safety system, such as the railway system. The master CPU 204 and the checker CPU 208 are configured to process the plurality of incoming data packets and communicate a plurality of outgoing data packets to safety relevant components of the external safety system. For example, the external safety system generates a first packet.

The first packet is communicated to a switch module, such as the switch module 124a as described with reference to FIG. 1. The switch module 124a duplicates the first packet. For example, the switch module 124a may use port mirroring in order to generate a first copy of the first packet and a second copy of the first packet. The first copy and the second copy include identical header information. For example, the first copy and the second copy use the same MAC address and the same IP address. Further, first copy and second copy maintain the sequence number of the first packet. For example, the first packet includes a sequence identifier. The sequence identifier may be a numerical value, a string of characters, or any other suitable identifier. The sequence identifier indicates the processing order of the first packet relative to the other packets of the plurality of incoming data packets.

In the example implementation, the master CPU 204 and the checker CPU 208 are not required to be synchronized to a reference clock. In other words, the master CPU 204 and the checker CPU 208 are not synchronized processors. However, in order for the master CPU 204 and the checker CPU 208 to execute tasks in same sequence, the master CPU 204 and the checker CPU 208 process received data packets based on the sequence identifier. When the switch module 124a generates the first and second copy, the switch module 124a includes the sequence identifier of the first packet with the first and second copy. In this manner, the first and second copy maintains the sequence order of the first packet.

The switch module 124a then communicates the first copy of the first packet to the processing module 304a. Similarly, the switch module 124a communicates the second copy of the first packet to the processing module 304b. In the example implementation, the voting modules 308a and 308b execute voting logic on the first and second copy prior to the processing modules 304a and 304b processing the first and second copies. For example, the voting module 308a intercepts the first copy prior to the processing module 304a receiving the first copy. Similarly, the voting module 308b intercepts the second copy prior to the processing module 304b receiving the second copy.

The voting module 308a includes an incoming voting module 312a. Similarly, the voting module 308b includes an incoming voting module 312b. The incoming voting modules 312a and 312b vote on data packets received by the master CPU 204 and the checker CPU 208 respectively. For example, the incoming voting modules 312a and 312b determine whether the first copy and the second copy are identical.

In the example implementation, the incoming voting module 312a generates a first packet signature based on the first copy. The first packet signature may be a unique character string generated based on header information included with the first copy. In other words, the first packet signature is unique to the first packet. Thus, because the first copy is identical to the first packet, the first packet signature of the first copy and the first packet are identical.

Similarly, the incoming voting module 312b generates a second packet signature based on the second copy. The second packet signature may be a unique character string generated based on header information included with the second copy. In other words, the second packet signature is unique to the first packet. Thus, because the second copy is identical to the first packet, the second packet signature of the second copy and the first packet are identical. The incoming voting module 312a communicates the first packet signature to the incoming voting module 312b. The incoming voting module 312b communicates the second packet signature to the incoming voting module 312a.

The incoming voting module 312a generates a first voting signal based on the determination of whether the first packet signature and the second packet signature are identical. When the incoming voting module 312a determines the first packet signature and the second packet signature are identical (i.e., voting was successful), the incoming voting module 312a generates the first voting signal. The incoming voting module 312a communicates the first voting signal to the incoming voting module 312b. Similarly, the incoming voting module 312b generates a second voting signal based on the determination of whether the first packet signature and the second packet signature are identical. When the incoming voting module 312b determines the first packet signature and the second packet signature are identical (i.e., voting was successful), the incoming voting module 312b generates the second voting signal. The incoming voting module 312*b* communicates the second voting signal to the incoming voting module 312*a*.

Conversely, when the incoming voting module 312*a*. determines the first packet signature and the second packet signature are not identical (i.e., voting was not successful); the incoming voting module 312*a* does not generate the first voting signal. Similarly, when the incoming voting module 312*b* determines the first packet signature and the second packet signature are not identical (i.e., voting was not successful); the incoming voting module 312*b* does not generate the second voting signal. In the example implementation, voting may, for example only, be unsuccessful due to a lost copy of a packet, an erroneously generated packet, or a mismatch in header information of the first and second copies. When one of the incoming voting modules 312*a* and 312*b* determine the first and second packet signatures are not identical (i.e., voting is not successful), the first packet is dropped and nothing is forwarded to the processing modules 304*a* and 304*b*.

The incoming voting module 312*a* communicates the first packet to the processing module 304*a* for further processing based on the first and second voting signals. For example, the incoming voting module 312*a* communicates the first copy to the processing module 304*a* when the incoming voting module 312*a* generates the first voting signal and the incoming voting module 312*a* receives the second voting signal. Similarly, the incoming voting module 312*b* communicates the second copy to the processing module 304*b* when the incoming voting module 312*b* generates the second voting signal and the incoming voting module 312*b* receives the first voting signal.

The processing module 304*a* generates a first outgoing packet based on the first copy. For example, the first copy of the first packet includes data elements to be acted on by at least one safety relevant component of an external safety critical system, such as the railway system described with respect to FIG. 1. The processing module 304*a* generates the first outgoing packet based on the data elements. The first outgoing packet includes the sequence identifier associated with the first packet and the data elements included with the first packet.

Similarly, the processing module 304*b* generates a second outgoing packet based on the second copy. For example, the second copy of the first packet includes data elements to be acted on by at least one safety relevant component an external safety critical system. The processing module 304*b* generates the second outgoing packet based on the data elements. The second outgoing packet includes the sequence identifier associated with the first packet and the data elements included with the first packet.

The voting module 308*a* includes an outgoing voting module 316*a*. The voting module 308*b* includes an outgoing voting module 316*b*. The processing module 304*a* communicates the first outgoing packet to the outgoing voting module 316*a*. Similarly, the processing module 304*b* communicates the second outgoing packet to the outgoing voting module 316*b*. The outgoing voting module 316*a* and 316*b* vote on data packets sent by processing modules 304*a* and 304*b* respectively. For example, the outgoing voting module 316*a* and 316*b* determine whether the first outgoing packet and the second outgoing packet are identical.

In the example implementation, the outgoing voting module 316*a* generates a first outgoing packet signature based on the first outgoing packet. The first outgoing packet signature may be a unique character string generated based on header information included with the first outgoing packet. In other words, the first outgoing packet signature is unique to the first outgoing packet.

Similarly, the outgoing voting module 316*b* generates a second outgoing packet signature based on the second outgoing packet. The second outgoing packet signature may be a unique character string generated based on header information included with the second outgoing packet. In other words, the second outgoing packet signature is unique to the second outgoing packet. The outgoing voting module 316*a* communicates the first outgoing packet signature to the outgoing voting module 316*b*. The outgoing voting module 316*b* communicates the second outgoing packet signature to the outgoing voting module 316*a*.

The outgoing voting module 316*a* generates a first outgoing voting signal based on the determination of whether the first outgoing packet signature and the second outgoing packet signature are identical. When the outgoing voting module 316*a* determines the first outgoing packet signature and the second outgoing packet signature are identical (i.e., voting was successful), the outgoing voting module 316*a* generates the first outgoing voting signal.

The outgoing voting module 316*a* communicates the first outgoing voting signal to the outgoing voting module 316*b*. Similarly, the outgoing voting module 316*b* generates a second outgoing voting signal based on the determination of whether the first outgoing packet signature and the second outgoing packet signature are identical. When the outgoing voting module 316*b* determines the first outgoing packet signature and the second outgoing packet signature are identical (i.e., voting was successful), the outgoing voting module 316*b* generates the second outgoing voting signal. The outgoing voting module 316*b* communicates the second outgoing voting signal to the outgoing voting module 316*a*.

Conversely, when the outgoing voting module 316*a* determines the first outgoing packet signature and the second outgoing packet signature are not identical (i.e., voting was not successful); the outgoing voting module 316*a* does not generate the first outgoing voting signal. Similarly, when the outgoing voting module 316*b* determines the first outgoing packet signature and the second outgoing packet signature are not identical (i.e., voting was not successful); the outgoing voting module 316*b* does not generate the second outgoing voting signal.

When one of the outgoing voting module 316*a* and 316*b* determine the first and second outgoing packet signatures are not identical (i.e., voting is not successful), the voting module 308*a* may instruct the master CPU 204 to operate in the safe state as described above with respect to FIG. 1. Alternatively, the voting module 308*b* may instruct the checker CPU 208 to operate in the safe state.

The outgoing voting module 316*a* communicates the first outgoing packet to the switch module 124*a* based on the first and second outgoing voting signals. For example, the outgoing voting module 316*a* communicates the first outgoing packet to the switch module 124*a* when the outgoing voting module 316*a* generates the first outgoing voting signal and the outgoing voting module 316*a* receives the second outgoing voting signal. The switch module 124*a* communicates the first outgoing packet to the at least one safety relevant component via the IOU modules 128*a*-128*f* as described in detail with respect to FIG. 1. The at least one safety relevant component may then operate according to the data elements included in the first outgoing packet.

Figure 4:
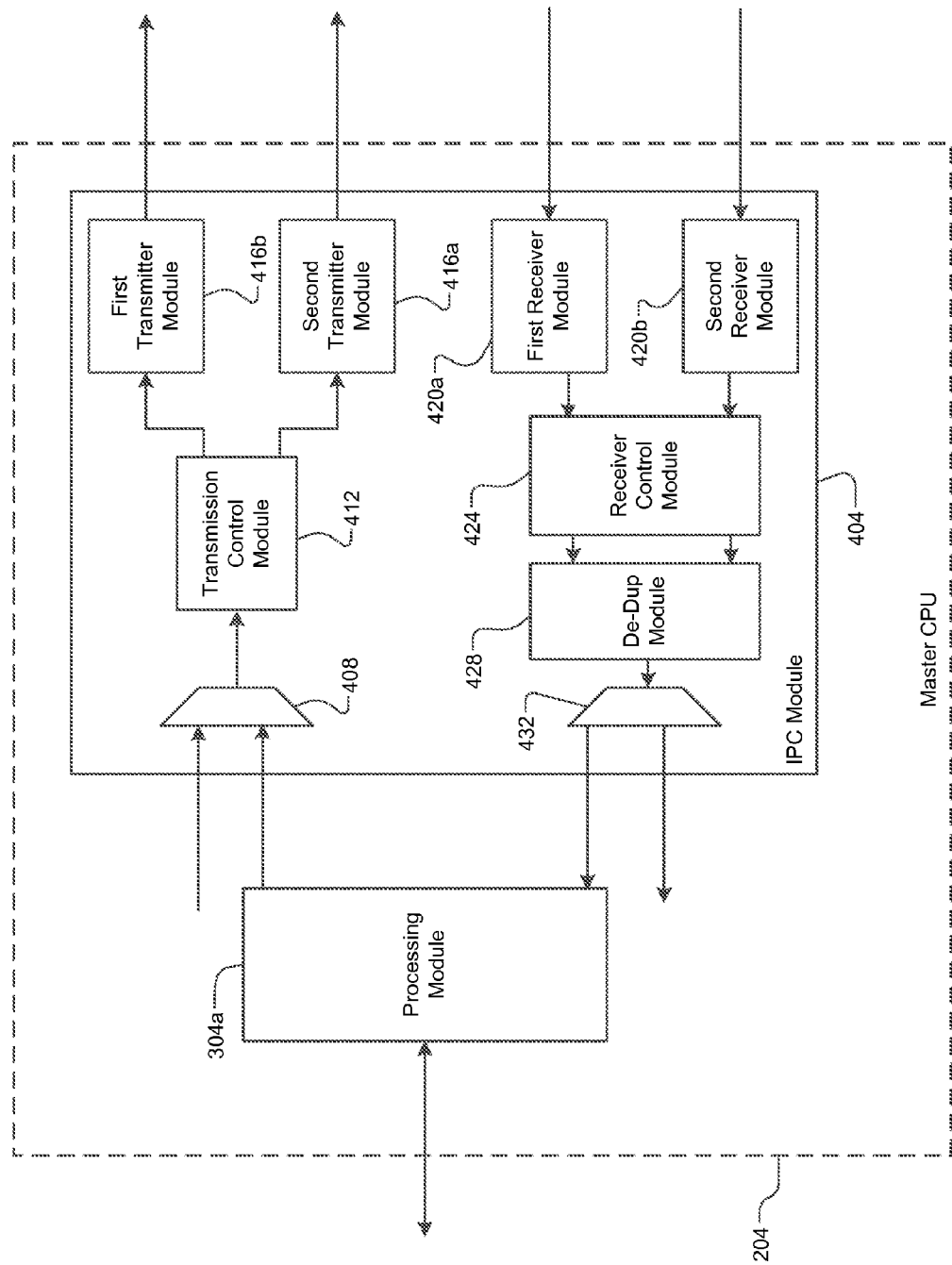
FIG. 4 is a functional block diagram of an inter-processor communication channel according to the principles of the present disclosure.

In some implementations, the master CPU 204 and the checker CPU 208 include an inter-process communication (IPC) channel 404 as shown in FIG. 4. In some implementations, IPC channel 404 is a dual-redundant, high speed, point-to-point serial communication link between the master CPU 204 and the checker CPU 208. The IPC channel 404 may be used for transmitting and receiving hardware and software synchronization data, incoming and outgoing data packets, and other IPC data. The IPC channel 404 communicates with an identical IPC channel within the checker CPU 208.

Further, the IPC channel 404 utilizes forward error correction (FEC) to increase the reliability of data communicated via the IPC channel 404. The master CPU 204 and the checker CPU 208 communicate voting and inter-processor communications via the IPC channel 404. By way of non-limiting example, the voting module 308*a* may communicate the first packet signature and the first voting signal to the voting module 308*b* via the IPC channel 404. While only the first packet signature and the first voting signal are described, it is understood the master CPU 204 may communicate any suitable communication via the IPC channel 404. Further, while only the master CPU 204 is shown to include the IPC channel 404, it is understood that the checker CPU 208 includes a similar IPC channel.

The IPC channel 404 includes a multiplexer (MUX) 408, a transmission control module 412, a first transmitter module 416*a*, and a second transmitter module 416*b*. The mux 408 receives a plurality of data packets. The mux 408 muxes the plurality of data packets and transmits one of the plurality of data packets. In one implementation, the mux 408 may be a 2n-to-1 multiplexer. For example, the mux 408 includes two inputs, one select bit, and one output. The mux 408 receives a first packet at a first input and a second packet at a second input. The mux 408 muxes the first packet and the second packet. For example, the mux 408 determines whether to send the first packet or the second packet to the output based on the select bit. For example, when the select bit is set to 1, the mux 408 sends the first packet to the output. When the select bit is set to 0, the mux 408 sends the second packet to the output.

The mux 408 receives IPC packets from the processing module 304*a* and data packets from voting module 308*a*. The IPC packets may include outgoing data packets, incoming data packets, voting signals, or any other inter-processing communication transmitted within the system 100. For example only, the processing module 304*a* transmits a data packet to the processing module 304*b*. Further, the incoming voting module 312*a* transmits the first voting signal to the incoming voting module 312*b*. It is understood that the mux 408 may receive packets from a plurality of sources within the system 100.

The mux 408 transmits a first data packet of the plurality of data packets to the transmission control module 412. The transmission control module 412 adds a sequence number to the first data packet and encodes the first data packet. In some implementations, the transmission control module 412 applies forward error correction (FEC) encoding to encode the first data packet. For example, the first data packet is comprised of a plurality of bits. The transmission control module 412 may encode each bit of the first data packet based on a predetermined protocol. The transmission control module 412 transmits each encoded bit multiple times. For example only, the transmission control module 412 may transmit each bit twice. It is understood, however, that the transmission control module 412 may transmit each bit any number of times.

A receiver receives each of the encoded bits transmitted by the transmission control module 412. The receiver is configured to compare each encoded bit against the predetermined protocol. The receiver accepts bits that conform to the protocol and disregards bits that do not conform to the protocol. In this manner, the receiver may correct errors that occur during transmission of the encoded bits.

The transmission control module 412 transmits a first copy of the first data packet to the first transmitter module 416*a*. The transmission control module 412 transmits a second copy of the first data packet to the second transmitter module 416*a*. It is understood that the first and second copies of the first data packet include a copy of the sequence number. It is further understood that the first and second copy are FEC encoded. In other words, the first and second copies are transmitted as a series of encoded bits. Further, the transmission control module 412 may transmit the series of encoded bits multiple times.

The first transmitter module 416*a* transmits the first copy of the first data packet to the IPC module within the checker CPU 208. Similarly, the second transmitter module 416*b* transmits the second copy of the first data packet to the IPC module within the checker CPU 208. While only transmitting to the checker CPU 208 is disclosed, it is understood that the first transmitter module 416*a* and second transmitter module 416*b* may communicate with any suitable component of the system 100.

The IPC module 404 also includes a first receiver module 420*a* and a second receiver module 420*b*. The first receiver module 420*a* receives a first copy of a second data packet and the second receiver module 420*b* receives a second copy of the second data packet. The second data packet includes a sequence number. Further, the second data packet is FEC encoded. The first receiver module 420*a* communicates the first copy of the second data packet to a receiver control module 424. Similarly, the second receiver module 420*b* communicates the second copy of the second data packet to the receiver control module 424.

The receiver control module 424 error checks and decodes the first copy and the second copy. For example, the receiver control module 424 may receive each encoded bit of the first and second copy multiple times as described above. The receiver control module 424 is configured to compare each transmission of each encoded bit of the first copy to the predetermined protocol. The receiver control module 424 determines whether each of the encoded bits of the first copy conforms to the predetermined protocol. When the receiver control module 424 determines one of the encoded bits does not conform to the predetermined protocol, the receiver control module 424 discards the encoded bit. When the receiver control module 424 determines one of the encoded bits does conform to the predetermined protocol, the receiver control module 424 keeps the bit.

Similarly, the receiver control module 424 determines whether each of the encoded bits of the second copy conforms to the predetermined protocol. When the receiver control module 424 determines one of the encoded bits does not conform to the predetermined protocol, the receiver control module 424 discards the encoded bit. When the receiver control module 424 determines one of the encoded bits does conform to the predetermined protocol, the receiver control module 424 keeps the bit.

In this manner, the receiver control module 424 corrects errors that occur during transmission of the encoded bits. In some cases, the receiver control module 424 may discard one of the first and second copies. For example, the receiver control module 424 may compare the number of discarded bits to a threshold. When the receiver control module 424 determines the number of discarded bits is greater than the threshold, the receiver control module 424 discards the copy. In some implementations, the receiver control module 424 increments an error counter.

For example, when the receiver control module 424 discards a bit, the receiver control module 424 increments the error counter. The receiver control module 424 compares the value of the error counter to the threshold. When the receiver control module 424 determines the error counter is greater than the threshold, the receiver control module 424 discards the packet associated with the discarded bits. The receiver control module 424 transmits the first and second copies to a de-duplication module 428. It is understood that the receiver control module 424 may transmit only the first copy, only the second copy, or neither the first or second copy based on the error check.

The de-duplication module 428 removes duplicate copies of a data packet. The de-duplication module 428 compares sequence numbers associated with received data packets. For example, the de-duplication module 428 compares the sequence number of the first copy to the sequence number of the second copy. When the de-duplication module 428 determines the first copy and the second copy include the same sequence number, the de-duplication module 428 removes the second copy.

The de-duplication module 428 then transmits the first copy to a de-multiplexer (demux) 432. The demux 432 is configured to receive a single input and communicate the input to a plurality of sources within the system 100. The demux 432 receives the first copy. The demux 432 communicates the first copy to a plurality of components within the system 100 based on header information included with the first copy. For example, the header information may indicate that the demux 432 communicate the first copy of the first data packet to the processing module 304a for further processing. Additionally or alternatively, the header information may indicate that the demux 432 communicate the first copy to other components within the system 100, for example, the incoming voting module 312a.

Figure 5:
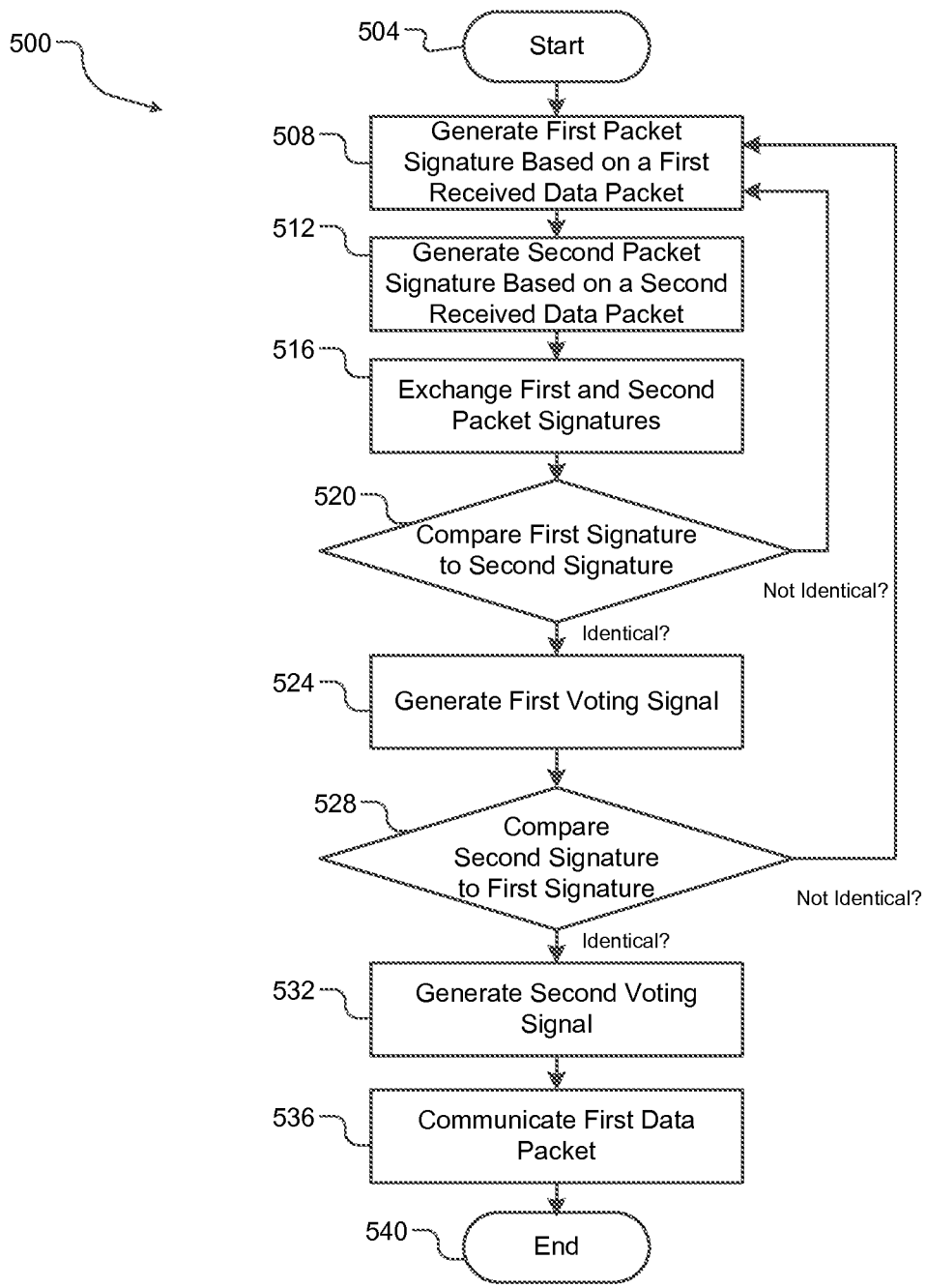
FIG. 5 is a flow diagram illustrating fault-tolerant voting method according to the principles of the present disclosure.

With particular reference to FIG. 5, a flow diagram illustrating an example fault-tolerant voting method 500 starts at 504. At 508, the method 500 generates a first packet signature based on a first received data packet. The data pack may be one of the plurality of incoming data packets or one of the plurality of outgoing data packets as described with respect to FIG. 3. At 512, the method 500 generates a second packet signature based on a second received data packet.

At 516, the method 500 exchanges the first packet signature and the second packet signature. For example, when the first data packet and the second data packet are incoming data packets, the incoming voting module 312a communicates the first packet signature to the incoming voting module 312b and the incoming voting module 312b communicates the second packet signature to the incoming voting module 312a. Similarly, when the first data packet and the second data packet are outgoing data packets, the outgoing voting module 316a communicates the first packet signature to the outgoing voting module 316b and the outgoing voting module 316b communicates the second packet signature to the outgoing module 316a.

At 520, the method 500 compares the first packet signature to the second packet signature. For example only, the incoming voting module 312a compares the first packet signature to the second packet signature. If the first packet signature is identical to the second packet signature, the method 500 continues at 524. If first packet signature is not identical to the second packet signature, the method 500 continues at 508. At 524, the method 500 generates a first voting signal.

At 528, the method 500 compares the second packet signature to the first packet signature. For example only, the incoming voting module 312b compares the second packet signature to the first packet signature. If the second packet signature is identical to the first packet signature, the method 500 continues at 532. If second packet signature is not identical to the first packet signature, the method 500 continues at 508. At 532, the method 500 generates a second voting signal. At 536, the method 500 communicates the first data packet. For example, the incoming voting module 312a communicates the first data packet to the processing module 304a for further processing. In another example, the outgoing voting module 316a communicates the first data packet to the switch module 124a as described above with respect to FIG. 1. At 540, the method 500 ends.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A fault-tolerant failsafe computer voting system comprising:

a switch module that generates a first copy of a first data packet and a second copy of the first data packet and that communicates the first copy and the second copy;

a first voting module that generates a first packet signature based on the first copy and communicates the first packet signature; and a second voting module that generates a second packet signature based on the second copy and communicates the second packet signature;

wherein the first voting module generates a first voting signal based on a comparison between the first packet signature and the second packet signature and the second voting module generates a second voting signal based on a comparison between the first packet signature and the second packet signature; and wherein the first voting module communicates the first copy based on the first voting signal and the second voting signal.

2. The system of claim 1 wherein the first voting module includes a first incoming voting module and wherein the second voting module includes a second incoming voting module.

3. The system of claim 2 wherein the switch module communicates the first copy to the first incoming voting module and the second copy to the second incoming voting module.

4. The system of claim 3 wherein the first incoming voting module generates the first packet signature and communicates the first packet signature to the second incoming voting module and wherein the second incoming voting module generates the second packet signature and communicates the second packet signature to the first incoming voting module.

5. The system of claim 4 wherein the first incoming voting module determines whether the first packet signature is identical to the second packet signature and wherein the second incoming voting module determines whether the second packet signature is identical to the first packet signature.

6. The system of claim 5 wherein the first incoming voting module generates the first voting signal in response to a determination that the first packet signature is identical to the second packet signature and wherein the second incoming voting module generates the second voting signal in response to a determination that the second packet signature is identical to the first packet signature.

7. The system of claim 1 wherein the first voting module communicates the first copy to a processing module.

8. The fault-tolerant failsafe computer voting system of claim 1 wherein the first voting module and the second voting module are identical and comprise separate components.

9. A fault-tolerant failsafe computer voting system comprising:
a first processing module that generates a first outgoing data packet and communicates the first outgoing data packet;
a second processing module that generates a second outgoing data packet and communicates the second outgoing data packet;
a first voting module that generates a first packet signature based on first outgoing data packet and communicates the first packet signature; and
a second voting module that generates a second packet signature based on the second outgoing data packet and communicates the second packet signature;
wherein the first voting module generates a first voting signal based on a comparison between the first packet signature and the second packet signature and the second voting module generates a second voting signal based on a comparison between the first packet signature and the second packet signature; and
wherein the first voting module communicates the first outgoing data packet based on the first voting signal and the second voting signal.

10. The system of claim 9 wherein the first voting module includes a first outgoing voting module and wherein the second voting module includes a second outgoing voting module.

11. The system of claim 10 wherein the first processing module communicates the first outgoing data packet to the first outgoing voting module and the second processing module communicates the second outgoing data packet to the second outgoing voting module.

12. The system of claim 11 wherein the first outgoing voting module generates the first packet signature and communicates the first packet signature to the second outgoing voting module and wherein the second outgoing voting module generates the second packet signature and communicates the second packet signature to the first outgoing voting module.

13. The system of claim 12 wherein the first outgoing voting module determines whether the first packet signature is identical to the second packet signature and wherein the second outgoing voting module determines whether the second packet signature is identical to the first packet signature.

14. The system of claim 13 wherein the first outgoing voting module generates the first voting signal in response to a determination that the first packet signature is identical to the second packet signature and wherein the second outgoing voting module generates the second voting signal in response to a determination that the second packet signature is identical to the first packet signature.

15. The system of claim 9 wherein the first voting module communicates the first outgoing packet to a switch module based on header information included with the first outgoing data packet.

16. The fault-tolerant failsafe computer voting system of claim 9 wherein the first processing module and the second processing module are identical and comprise separate components, and the first voting module and the second voting module are identical and comprise separate components.

17. A fault-tolerant failsafe computer voting method comprising:
generating a first copy of a first data packet and a second copy of the first data packet;
communicating the first copy and the second copy;
generating a first packet signature based on the first copy;
communicating the first packet signature;
generating a second packet signature based on the second copy;
communicating the second packet signature;
generating a first voting signal based on a comparison between the first packet signature and the second packet signature;
generating a second voting signal based on a comparison between the first packet signature and the second packet signature; and
communicating the first copy based on the first voting signal and the second voting signal.

18. The method of claim 17 further comprising determining whether the first packet signature is identical to the second packet signature.

19. The method of claim 18 further comprising generating the first voting signal in response to a determination that the first packet signature is identical to the second packet signature.

20. The method of claim 17 further comprising determining whether the second packet signature is identical to the first packet signature.

21. The method of claim 20 further comprising generating the second voting signal in response to a determination that the second packet signature is identical to the first packet signature.

22. The fault-tolerant failsafe computer voting method of claim 20 wherein the communicating the first packet signature and the second packet signature further comprises communicating the first packet signature to first components and communicating the second packet signature to identical, separate second components.

23. The method of claim 17 further comprising communicating the first copy to a processing module.

* * * * *